(12) United States Patent
Malinowski

(10) Patent No.: US 11,987,078 B1
(45) Date of Patent: May 21, 2024

(54) BUOYANT VEHICLE TIRE DEVICE AND METHOD

(71) Applicant: Kevin Malinowski, Fargo, ND (US)

(72) Inventor: Kevin Malinowski, Fargo, ND (US)

( * ) Notice: Subject to any disclaimer, the term of this patent is extended or adjusted under 35 U.S.C. 154(b) by 0 days.

(21) Appl. No.: 18/086,036

(22) Filed: Dec. 21, 2022

(51) Int. Cl.
*B60C 11/117* (2006.01)
*B60C 11/03* (2006.01)
*B60C 11/16* (2006.01)

(52) U.S. Cl.
CPC ........ B60C 11/1612 (2013.01); B60C 11/032 (2013.01); *B60C 2200/14* (2013.01)

(58) Field of Classification Search
CPC ............................ B60C 11/1612; B60C 11/032
See application file for complete search history.

(56) References Cited

U.S. PATENT DOCUMENTS

| | | | | |
|---|---|---|---|---|
| 917,733 | A * | 4/1909 | Kempshall | B60C 11/032 D12/573 |
| 2,283,843 | A | 5/1942 | Zamora | |
| 3,272,252 | A * | 9/1966 | Nordquist | B60C 11/16 152/211 |
| 3,340,921 | A | 9/1967 | Garfinkle | |
| 4,257,836 | A * | 3/1981 | Beneze | B29D 30/06 152/452 |
| 5,203,933 | A * | 4/1993 | Nagahisa | B60C 11/032 152/209.15 |
| 2005/0167020 | A1 | 8/2005 | Rooney | |
| 2006/0191615 | A1 | 8/2006 | O'Brien | |
| 2008/0047645 | A1* | 2/2008 | Gerhardt | B60C 11/1612 156/114 |

FOREIGN PATENT DOCUMENTS

| | | | |
|---|---|---|---|
| CH | 17129 A | * | 6/1898 |
| DE | 2305558 A | * | 2/1973 |
| DE | 2422929 A1 | | 1/1975 |
| DE | 102010045120 A1 | * | 3/2012 |
| EP | 3050717 | | 8/2016 |
| FR | 2762259 A3 | * | 10/1998 |
| KR | 20090053389 | | 5/2009 |
| WO | WO-98/58810 A1 | * | 12/1998 |

OTHER PUBLICATIONS

Machine translation for German 2305558 (Year: 2023).*
Machine translation for German 102010045120 (Year: 2023).*
Machine translation for France 2762259 (Year: 2023).*
Machine translation for German 2,422,929 (Year: 2024).*
Machine translation for Switzerland 17129 (Year: 2024).*
Partial translation for Switzerland 17129 (Year: 2024).*

* cited by examiner

*Primary Examiner* — Steven D Maki

(57) ABSTRACT

A buoyant vehicle tire device for facilitating driving in muddy soil includes a tire having an exterior wall and a pair of side walls is attached to each one of a pair of side edges of the exterior wall. A vehicle rim is sealed against the end edge of each side wall and encloses a pressurized space between the side walls and the exterior wall of the tire and the vehicle rim. A valve is coupled to the vehicle rim and is in fluid communication with the pressurized space. A plurality of depressions is positioned on the exterior wall and is pushed out from a first position to a second position when the pressurized space receives additional air. The first position of each of the depressions has a container space receiving air when driving in muddy soil, wherein the depressions provide buoyancy to the tire in muddy soil.

6 Claims, 6 Drawing Sheets

BUOYANT VEHICLE TIRE DEVICE AND METHOD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to vehicle tires and more particularly pertains to a new vehicle tire for facilitating driving in muddy soil.

(2) Description of Related Art Including Information Disclosed Under 37 CFR 1.97 and 1.98

The prior art relates to vehicle tires and includes a variety of vehicle tires inflating the tire with having a pressurized air space, Known prior art does not include a vehicle tire having a plurality of depressions inflating from a first position to a second position such that each depression the first position has a space for retaining air and providing buoyancy to the vehicle tire.

BRIEF SUMMARY OF THE INVENTION

An embodiment of the disclosure meets the needs presented above by generally comprising a tire having an exterior wall and a pair of side walls is attached to each one of a pair of side edges of the exterior wall. A vehicle rim is sealed against the end edge of each side wall and encloses a pressurized space between the side walls and the exterior wall of the tire and the vehicle rim, wherein the side walls are airtight to the vehicle rim. A valve is coupled to the vehicle rim and is in fluid communication with the pressurized space. A plurality of depressions is positioned on the exterior wall and is pushed out from a first position to a second position when the pressurized space receives additional air. The first position of each of the depressions has a container space configured for receiving air when driving in muddy soil, wherein the depressions provide buoyancy to the tire in muddy soil.

Another embodiment of the disclosure comprises a method including the steps of rotatably attaching a vehicle rim of a tire to a vehicle and coupling a hose of an air compressor to a valve. A switch to turn on the air compressor is engaged with to inflate each depression to be flat upon an exterior wall of the tire wherein the flattened depressions provide traction driving on a conventional road. The switch is engaged with a second time to turn off the air compressor to deflate each depression to be concavely arcuate upon the exterior wall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
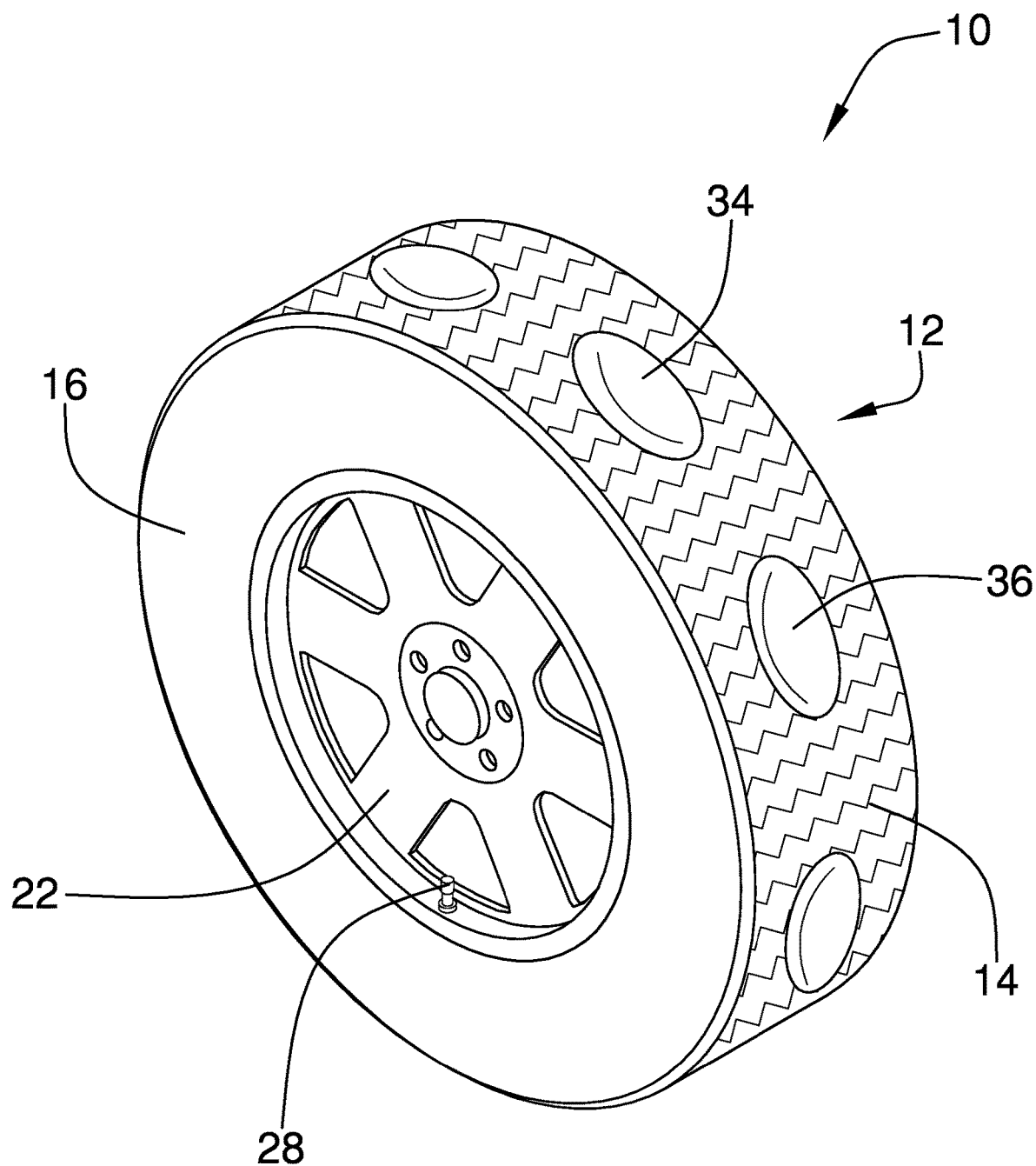
FIG. 1 is a front isometric view of a buoyant vehicle tire device and method according to an embodiment of the disclosure.
Figure 2:
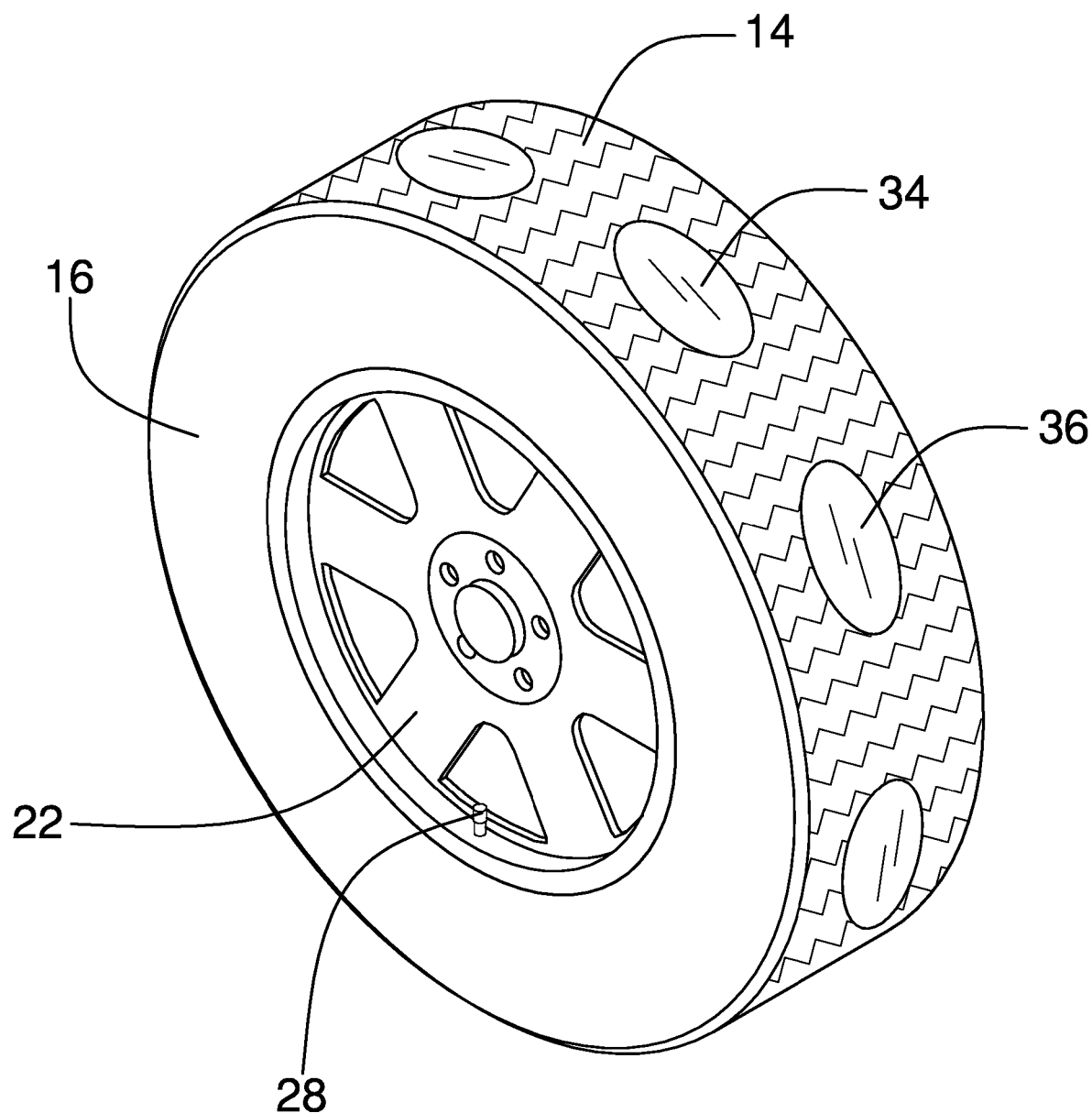
FIG. 2 is a front isometric view of an embodiment of the disclosure.
Figure 3:
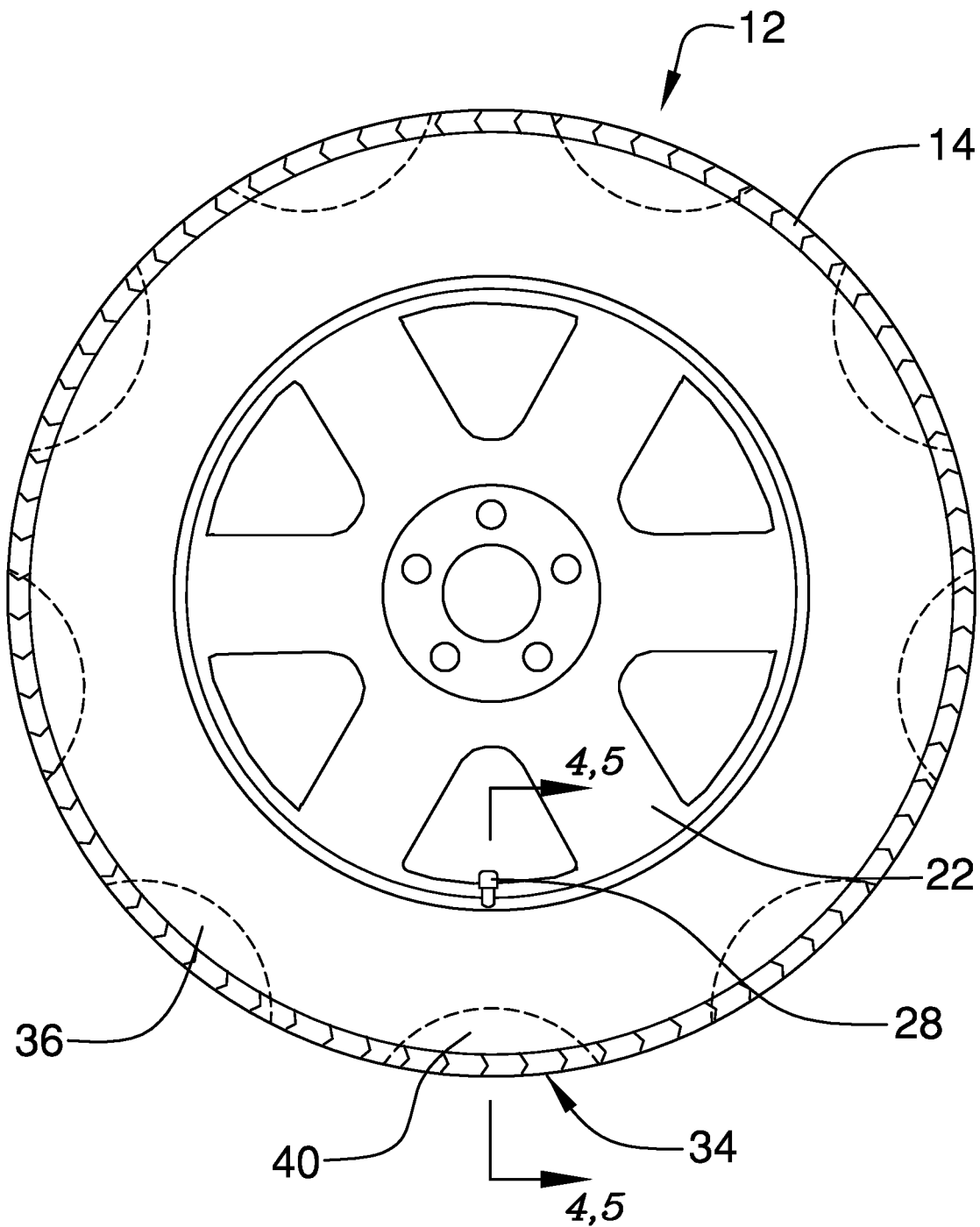
FIG. 3 is a front view of an embodiment of the disclosure.

With reference now to the drawings, and in particular to FIGS. 1 through 7 thereof, a new vehicle tire embodying the principles and concepts of an embodiment of the disclosure and generally designated by the reference numeral 10 will be described.

As best illustrated in FIGS. 1 through 7, the buoyant vehicle tire device and method 10 generally comprises As best illustrated in FIGS. 1 through 6, the buoyant vehicle tire device 10 generally comprises a tire 12 having an exterior wall 14 and a pair of side walls 16 is attached to each one of a pair of side edges 18 of the exterior wall 14. The side walls 16 extend inward towards a center axis of the exterior wall 14 and each side wall 16 has an end edge 20. The tire 12 typically comprises a rubber material and is resiliently flexible.

A vehicle rim 22 is sealed against the end edge 20 of each side wall 16 and encloses a pressurized space 24 between the side walls 16 and the exterior wall 14 of the tire 12 and the vehicle rim 22, wherein the side walls 16 are airtight to the vehicle rim 22. The vehicle rim 22 is configured for rotatably attaching to a vehicle 26. The vehicle rim 22 normally is a circular shape and will normally comprise a metal material being rigid. A valve 28 is coupled to the vehicle rim 22 and is in fluid communication with the pressurized space 24. The valve 28 is configured for coupling with a hose 30 of an air compressor 32, wherein the hose 30 adds air to the pressurized space 24 or removes air from the pressurized space 24. The air compressor 32 may be positioned within the vehicle 26 or proximate to the vehicle 26 when attaching the hose 30 of the air compressor 32 to the valve 28.

A plurality of depressions 34 is positioned on the exterior wall 14 and is pushed out from a first position 36 to a second position 38 when the pressurized space 24 receives additional air. The first position 36 of each of the depressions 34 has a container space 40 configured for receiving air when driving in muddy soil 42, wherein the depressions 34 provide buoyancy to the tire 12 in muddy soil 42. The second position 38 of each depression 34 is flat upon the exterior wall 14 of the tire 12 such that each depression 34 is coplanar with the traction grooves of the exterior wall 14 of the tire 12. The depressions 34 are typically spaced between the side walls 16 and each depression 34 may comprise an oval shape being concavely arcuate in the first position 36.

In use, the vehicle rim 22 of the tire 12 is rotatably attached to a vehicle 26 and couples the hose 30 of the air compressor 32 to a valve 28. A switch 44 to turn on the air compressor 32 is engaged with to inflate each depression 34 into the second position 38 to be flat upon the exterior wall 14 of the tire 12, wherein the flattened depressions 34 provide traction driving on a conventional road. The switch 44 is engaged with a second time to turn off the air compressor 32 to deflate each depression into the first position 36 to be concavely arcuate upon the exterior wall 14. Each depression 34 is deflated into the first position 36 to facilitate driving in a muddy soil 42 or another unstable soil.

Figure 4:
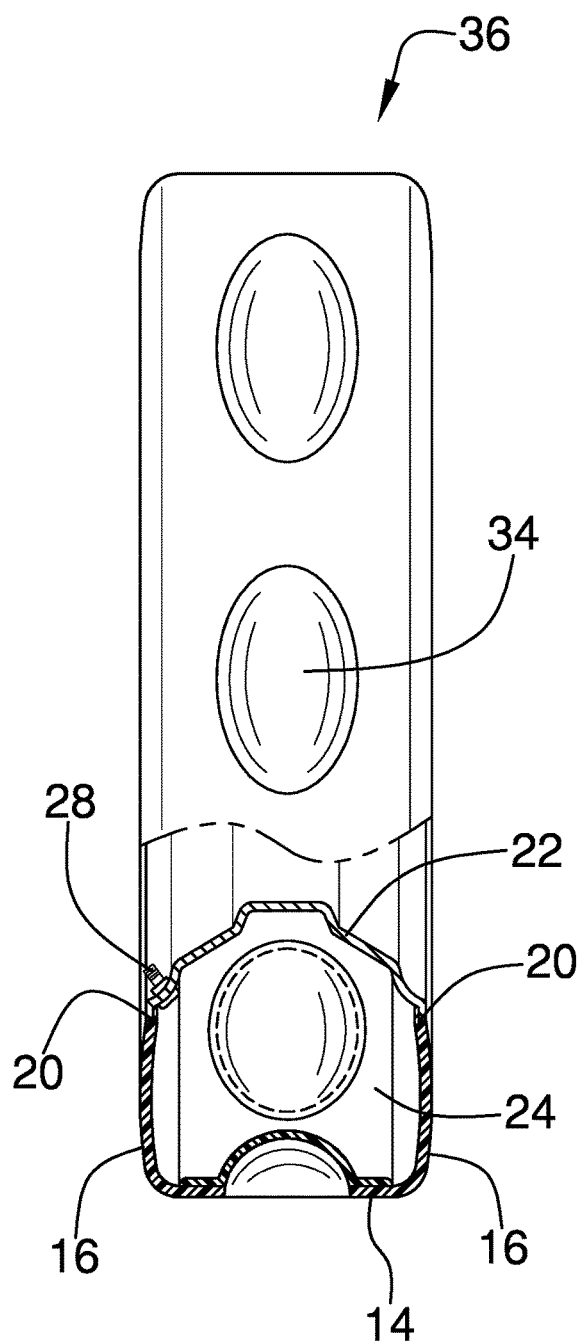
FIG. 4 is a cross-sectional view of an embodiment of the disclosure taken along Line 4-4 of FIG. 3.
Figure 5:
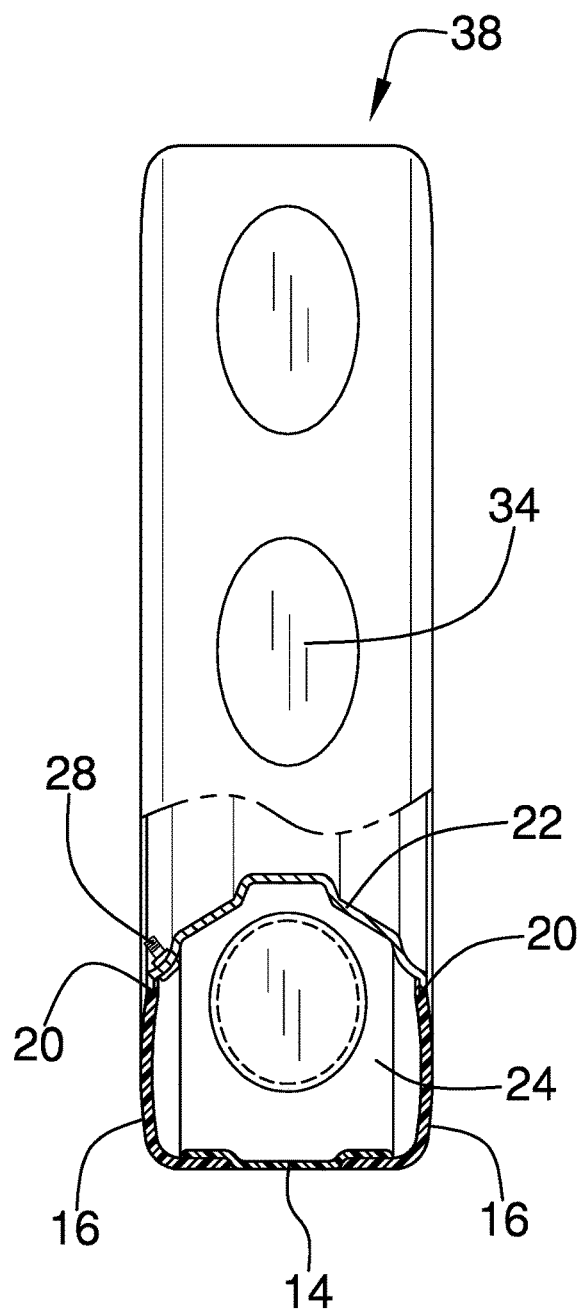
FIG. 5 is a cross-sectional view of an embodiment of the disclosure taken along Line 5-5 of FIG. 3.
Figure 6:
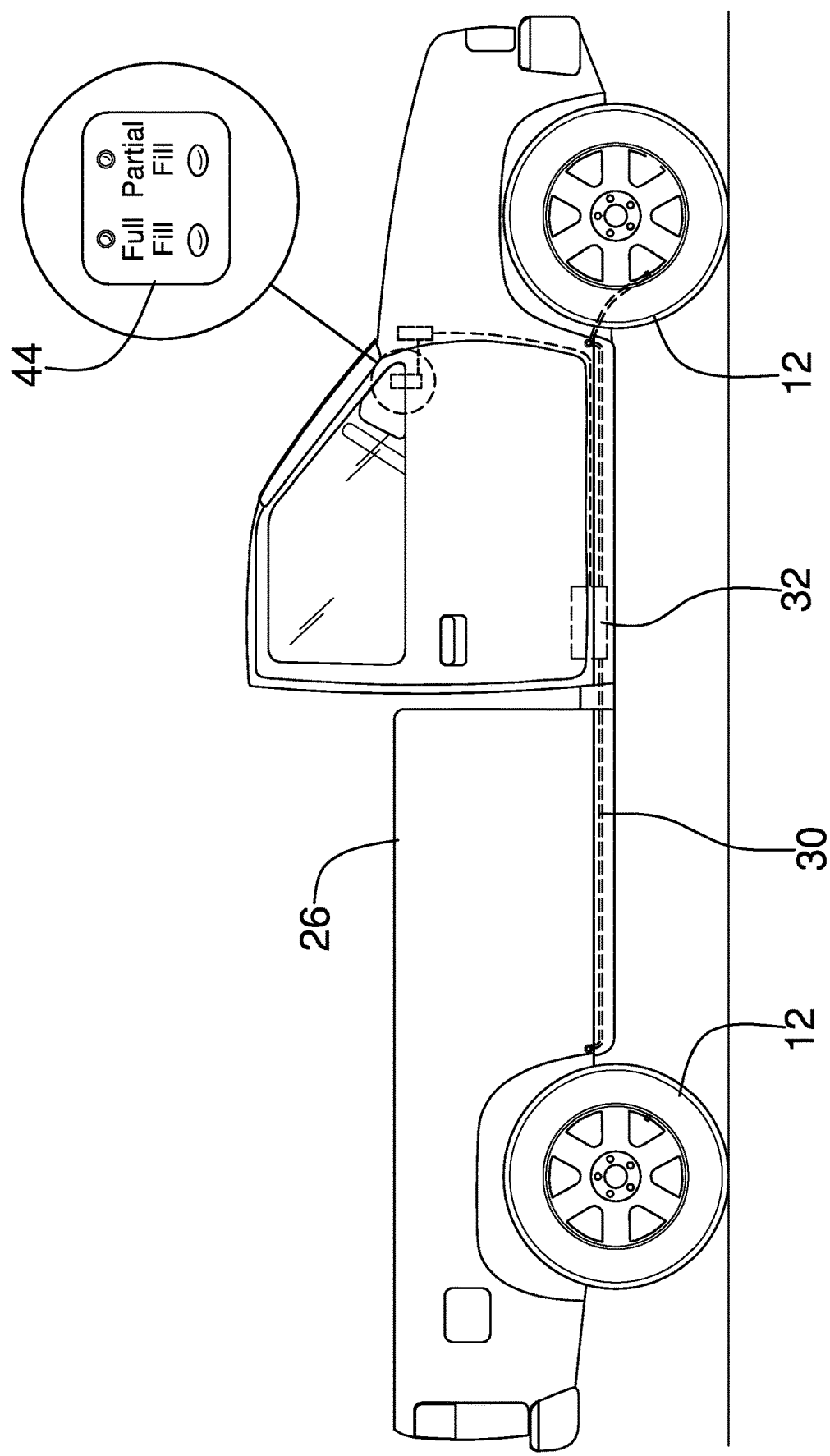
FIG. 6 is an in-use view of an embodiment of the disclosure.
Figure 7:
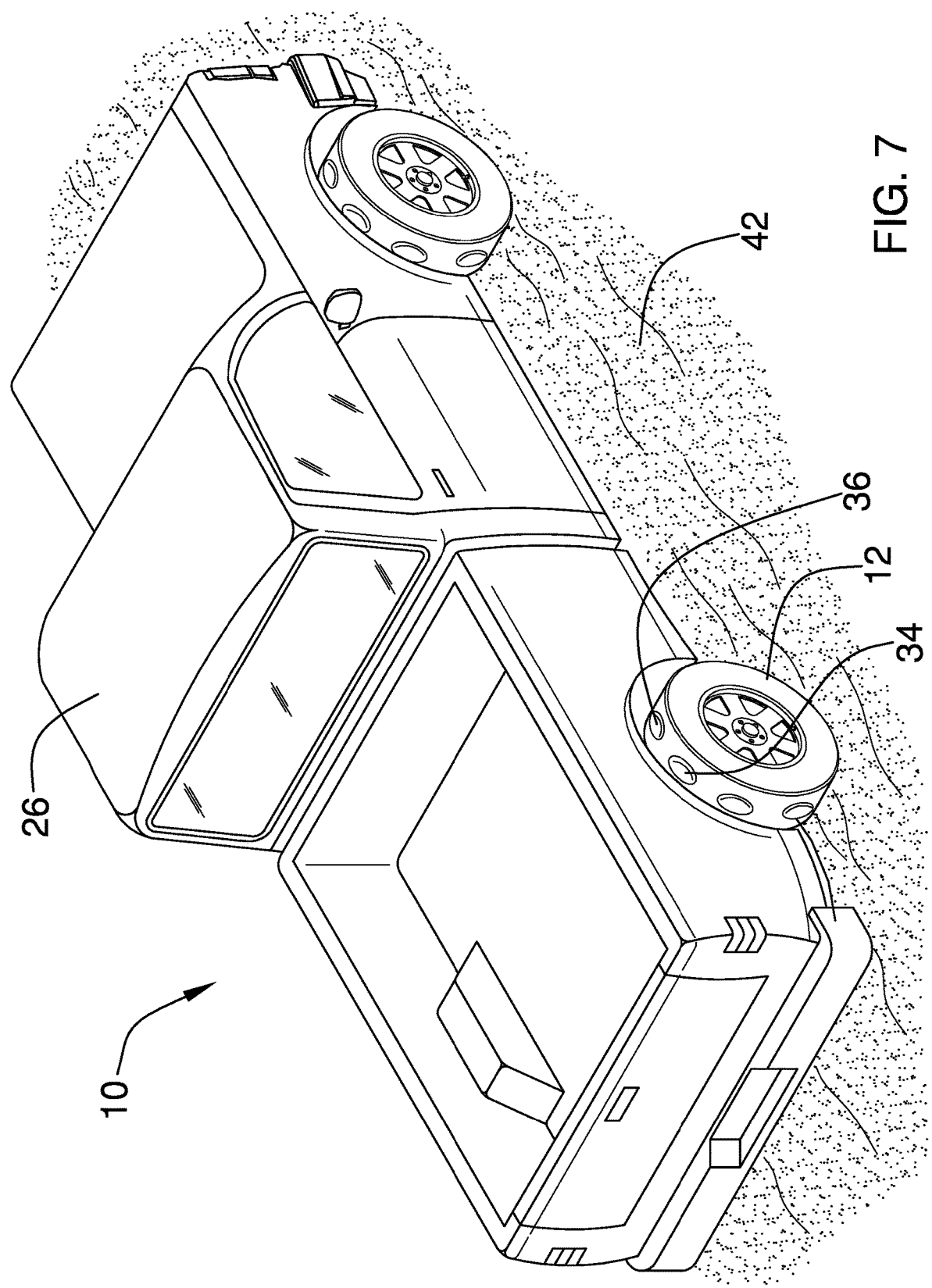
FIG. 7 is an in-use view of an embodiment of the disclosure.

As can be seen in FIGS. 1 and 4, the depressions are located on a tire equator of the tire between a first shoulder region of the exterior wall and a second shoulder region of the exterior wall and wherein, in an axial cross section of the tire passing through a maximum axial width of a depression, the maximum axial width of the depression is larger than an axial width of each shoulder region between the side edge of the exterior wall and the depression.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle tire device comprising:
   a tire having an exterior wall and a pair of side walls being attached to each one of a pair of side edges of the exterior wall;
   a vehicle rim being sealed against an end edge of each side wall and enclosing a pressurized space between the side walls and the exterior wall of the tire and the vehicle rim, wherein the side walls are airtight to the vehicle rim;
   a valve being coupled to the vehicle rim and being in fluid communication with the pressurized space; and
   a plurality of depressions being positioned on the exterior wall and being pushed out from a first position to a second position when the pressurized space receives additional air, the first position of each of the depressions having a container space configured for receiving air when driving in muddy soil, wherein the depressions provide buoyancy to the tire in muddy soil, each depression being aligned with the exterior wall of the tire when in its second position wherein the depressions are located on a tire equator of the tire between a first shoulder region of the exterior wall and a second shoulder region of the exterior wall and wherein, in an axial cross section of the tire passing through a maximum axial width of a depression, the maximum axial width of the depression is larger than an axial width of each shoulder region between the side edge of the exterior wall and the depression.

2. The vehicle tire device of claim 1, wherein the side walls extend inward towards a center axis of the exterior wall, each side wall having an end edge, the tire comprising a rubber material and being resiliently flexible.

3. The vehicle tire device of claim 2, wherein the vehicle rim is configured for rotatably attaching to a vehicle, the vehicle rim being a circular shape, the vehicle rim comprising a metal material which is rigid.

4. The vehicle tire device of claim 3, wherein the valve is configured for coupling with a hose of an air compressor, wherein the hose adds air to the pressurized space or removes air from the pressurized space.

5. A method for using the vehicle tire device of claim 1 comprising the steps of:
   rotatably attaching the vehicle rim of the vehicle tire device to a vehicle;
   coupling a hose of an air compressor to the valve;
   engaging a switch to turn on the air compressor to inflate each depression to be aligned with the exterior wall of the tire;
   driving, with the depressions aligned with the exterior wall of the tire, the vehicle via traction between the vehicle tire device and a road;
   engaging the switch a second time to turn off the air compressor to deflate each depression to be concavely arcuate upon the exterior wall; and
   driving, with the depressions being concavely arcuate upon the exterior wall, the vehicle in muddy soil, wherein the plurality of depressions provide buoyancy to the vehicle tire device in the muddy soil.

6. A vehicle tire device comprising:

a tire having an exterior wall and a pair of side walls being attached to each one of a pair of side edges of the exterior wall, the side walls extending inward towards a center axis of the exterior wall, each side wall having an end edge, the tire comprising a rubber material and being resiliently flexible;

a vehicle rim being sealed against the end edge of each side wall and enclosing a pressurized space between the side walls and the exterior wall of the tire and the vehicle rim, wherein the side walls are airtight to the vehicle rim, the vehicle rim being configured for rotatably attaching to a vehicle, the vehicle rim being a circular shape, the vehicle rim comprising a metal material which is rigid;

a valve being coupled to the vehicle rim and being in fluid communication with the pressurized space, the valve being configured for coupling with a hose of an air compressor, wherein the hose adds air to the pressurized space or removes air from the pressurized space;

a plurality of depressions being positioned on the exterior wall and being pushed out from a first position to a second position when the pressurized space receives additional air, the first position of each of the depressions having a container space configured for receiving air when driving in muddy soil, wherein the depressions provide buoyancy to the tire in muddy soil, each depression being aligned with the exterior wall of the tire when in its second position, the depressions being spaced between the side walls, each depression comprising an oval shape and being concavely arcuate when in the first position wherein the depressions are located on a tire equator of the tire between a first shoulder region of the exterior wall and a second shoulder region of the exterior wall and wherein, in an axial cross section of the tire passing through a maximum axial width of a depression, the maximum axial width of the depression is larger than an axial width of each shoulder region between the side edge of the exterior wall and the depression.

* * * * *